(12) United States Patent
Geibel et al.

(10) Patent No.: US 8,323,514 B2
(45) Date of Patent: Dec. 4, 2012

(54) METHOD AND SYSTEM FOR CLEANING FILTER MEDIA SUPPORT STRUCTURES

(75) Inventors: John L. Geibel, Butler, PA (US); Eugene M. Vegso, Cranberry Township, PA (US); Christopher J. Ball, McDonald, PA (US); Robert L. Laird, Cranberry Township, PA (US); Thomas M. Getting, Pittsburgh, PA (US); Dean T. Berkebile, Cranberry Township, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 752 days.

(21) Appl. No.: 12/406,694

(22) Filed: Mar. 18, 2009

(65) Prior Publication Data
US 2010/0237025 A1    Sep. 23, 2010

(51) Int. Cl.
*B01D 24/46* (2006.01)
*B01D 24/00* (2006.01)

(52) U.S. Cl. ........ 210/792; 210/616; 210/807; 210/269; 210/291

(58) Field of Classification Search .................. None
See application file for complete search history.

(56) References Cited

U.S. PATENT DOCUMENTS

| | | | | |
|---|---|---|---|---|
| 3,581,895 A | * | 6/1971 | Howard et al. | 210/108 |
| 3,840,117 A | * | 10/1974 | Ross | 210/794 |
| 5,089,147 A | * | 2/1992 | Ross | 210/793 |
| 5,332,497 A | * | 7/1994 | Shea et al. | 210/274 |
| 5,639,384 A | * | 6/1997 | Brown et al. | 210/794 |
| 6,423,216 B1 | * | 7/2002 | Yum et al. | 210/150 |
| 8,070,946 B2 | * | 12/2011 | Roberts et al. | 210/274 |
| 2007/0175832 A1 | | 8/2007 | Roberts | |

* cited by examiner

*Primary Examiner* — Krishnan S Menon
(74) *Attorney, Agent, or Firm* — The Webb Law Firm, PC (57) ABSTRACT

The present invention is related to a method and system for cleaning a media support structure in a filter cell in a liquid filter system, wherein a cleaning solution does not significantly enter a filter media zone. The method comprises supplying a cleaning solution to a filter cell to a level sufficient to submerge the media support structure, but not to significantly enter the filter media zone. Additionally, the cleaning solution level is monitored to ensure the cleaning solution does not significantly enter the filter media zone. Alternatively, the cleaning solution may be continuously recirculated and reintroduced to the filter cell during the cleaning operation.

24 Claims, 7 Drawing Sheets

METHOD AND SYSTEM FOR CLEANING FILTER MEDIA SUPPORT STRUCTURES

BACKGROUND OF THE INVENTION

1. Field of the Invention

The present invention is directed to liquid filter cells in liquid filtration systems. In particular, the present invention is directed to a method and system for the removal of fouling and clogging material in a filter media support structure in a liquid filter cell.

2. Description of Related Art

Gravity or pressure liquid filter systems often employ filter cells with filter media zones or zones to remove suspended contaminants, such as dirt particles, from a feed liquid. The filter cells operate to remove suspended contaminants by allowing the liquid, oftentimes water, to flow through a filter media zone. As the liquid passes through the filter media zone, the contaminants are collected in the filter media. The filtered liquid is then removed via an underdrain or collection system for further downstream processing.

The filter media is often comprised of a granular material. For this reason, the filter media must be supported, in some manner, in order to prevent the filter media material from passing with the filtered liquid through the underdrain or collection system. Filter media support structures, or media retainers, are designed to allow the filtered liquid to flow through to the underdrain, while prohibiting the filter media or other treatment material from passing to the underdrain or collection area. Filter media support structures either contain gravel or are gravel-less. Existing filter media support structures commonly comprise material with slots, perforations, apertures, or other geometrically-shaped openings; plastic or other material chemically held or sintered together; or other material manufactured to preclude the passage of filter media to the underdrain or collection area. Media support structures of either the gravel or gravel-less type are prone to fouling and clogging by biological matter and chemical scaling, thereby blocking the flow of filtered liquid. As a result, the pressure drop across the media support structure will increase and may ultimately cause the filter cell to fail when the headloss across the system exceeds the design pressure drop. The underdrain itself may be considered part of the filter media support structure and may itself be in need of cleaning from scaling or fouling.

For this reason, routine monitoring of the pressure drop across the filter media support is required. A number of methods are well known and acceptable, including the methods disclosed in United States Patent Application Publication No. 2007/0175832 to Roberts. Using one of such well known methods, once the pressure drop is determined to be unacceptable for operation, maintenance of the media support structure must be performed.

Filters are commonly backwashed periodically to remove collected contaminants and debris from the filter media. One method of cleaning media support structures is adding chemicals capable of removing fouling and clogging material to the backwash liquid. The backwash liquid, now in a solution with the chemical(s), is then introduced to the filter cell to some height above the filter media zone, completely submerging the filter media. The solution may then be agitated and allowed to soak all components of the filter cell for several hours until the solution is removed. Another common method requires the entire removal of filter media, thereby exposing the media support structure. The media support structure is then sprayed and/or soaked with cleaning solution.

Both above-identified methods can be problematic. Often times, exposing the filter media zone to chemicals or cleaning agents can damage the filter media, particularly in filter cells which utilize biologically active filter media zones. Therefore, such systems are incompatible with maintenance procedures that submerge the filter media zone in a cleaning solution. Additionally, these types of procedures require a large amount of cleaning solution. Maintenance procedures requiring complete removal of the filter media zone are time consuming and can result in prolonged disruptions in operation. If removed or exposed to cleaning solutions, biologically active filter media zones may require several weeks to reach optimal levels of biological activity required for filter operations.

Therefore, it is desirable to have a method and system for cleaning a media support structure in a filter system, which employs a filter media zone, which method and system overcome the above-described deficiencies.

SUMMARY OF THE INVENTION

The present invention is directed to a method for cleaning fouling or scaling from a filter media support structure in a filter system having at least one filter cell, the filter media support structure underlying a zone of filter media. A method having features of the present invention comprises draining a feed liquid from at least one filter cell; supplying a cleaning liquid to the filter system in an amount sufficient to submerge the media support structure; and removing the cleaning liquid from the filter cell. At least a substantial portion of the filter media in the filter cell is left in the filter cell during the entire process, thereby facilitating efficient removal of fouling material; and although the media support structure is submerged in a cleaning liquid, the amount of cleaning liquid is not sufficient to significantly enter the filter media zone. Thus, the filter media is not damaged by cleaning liquid.

The present invention is also directed to a method for cleaning biological fouling from a filter media support structure in a gravity filter system having at least one filter cell, the filter media support structure underlying a zone of filter media having desirable biologic constituents. In this embodiment, the step of removing the cleaning liquid from the filter cell comprises removing the cleaning liquid without substantially reducing the amount of desirable biologic constituents in the filter media zone.

The present invention is also directed to a method for cleaning fouling or scaling from a filter media support structure in a filter system having at least one filter cell, the filter media support structure underlying a zone of filter media, wherein the method further comprises soaking the filter media support structure in the cleaning liquid.

Additionally, the present invention is directed to a method for cleaning fouling or scaling from a filter media support structure in a filter system having at least one filter cell, the filter media support structure underlying a zone of filter media, wherein the step of supplying a cleaning liquid to the filter system in an amount sufficient to submerge the media support structure, but not significantly enter the filter media zone comprises mixing backwash water with a cleaning agent to produce the cleaning liquid.

Furthermore, the present invention is directed to a method for cleaning fouling or scaling from a filter media support structure in a filter system having at least one filter cell, the filter media support structure underlying a zone of filter media, wherein the step of supplying the cleaning liquid to the filter system in an amount sufficient to submerge the media support structure, but not to significantly enter the filter media zone comprises supplying the cleaning liquid from above the filter media zone; supplying the cleaning liquid via a liquid delivery conduit which extends from a top portion of the filter media zone to a bottom portion of the filter media zone at a point above the media support structure; supplying the cleaning liquid via a pipe grid; supplying the cleaning liquid to one or more points located in an underdrain system; supplying the cleaning liquid to one or more points located in a flume chamber; and supplying the cleaning liquid through a pipe connected to a flume chamber selected from the group consisting of an effluent pipe and a backwash pipe.

The present invention is also directed to a method for cleaning fouling or scaling from a filter media support structure in a filter system having at least one filter cell, the filter media support structure underlying a zone of filter media further comprising the step of monitoring an amount of fouling the media support structure. Additionally, monitoring the amount of fouling may comprise measuring a pressure drop across the media support structure.

The present invention is further directed to a method for cleaning fouling or scaling from a filter media support structure in a filter system having at least one filter cell, the filter media support structure underlying a zone of filter media, which also comprises the step of monitoring the level of cleaning liquid in the filter cell. Monitoring the level of cleaning liquid in the filter cell may be accomplished by means of a level sight tube or by monitoring the flow of cleaning liquid into an overflow structure selected from the group consisting of an overflow pipe and an overflow weir.

Also, the present invention is directed to a method for cleaning fouling or scaling from a filter media support structure in a filter system having at least one filter cell, the filter media support structure underlying a zone of filter media, further comprising the step of reclaiming the solution after removing the solution from the filter cell. The step of reclaiming may comprise one or more of the following: removing solid fouling material from the cleaning liquid; filtering the cleaning liquid; decanting the cleaning liquid; increasing a pH of the cleaning liquid; and decreasing a pH of the cleaning liquid.

Further yet, the present invention is directed to a method for cleaning fouling or scaling from a filter media support structure in a filter system having at least one filter cell, the filter media support structure underlying a zone of filter media, wherein the cleaning liquid comprises one or more of the group consisting of chlorine, hydrochloric acid, sodium hydrochloride, sodium hydroxide and combinations thereof.

The present invention is also directed to a method for cleaning fouling or scaling from a filter media support structure in a filter system having at least one filter cell, the filter media support structure underlying a zone of filter media further comprising the step of agitating the cleaning liquid. The step of agitating may take the form of agitating by air scour.

The present invention is further directed to a method to clean fouling or scaling from a filter media support structure in a filter system having at least one filter cell, the filter media support structure underlying a zone of filter media, further comprising the step of backwashing the filter cell.

Moreover, the present invention is directed to a method for cleaning a filter media support structure in a filter system having one or more filter cells, the filter media support structure underlying a zone of filter media, the method comprising the steps of draining a feed liquid from a filter cell; supplying a cleaning liquid to the filter cell via a cleaning liquid supply system; recirculating the solution to the solution supply system for reintroduction to the filter cell; monitoring a level of the cleaning liquid in the filter cell; and controlling the level of solution in the filter cell while recirculating. At least a substantial portion of the filter media is left in the filter cell, and the amount of cleaning liquid is controlled, such that the amount of cleaning liquid in the filter cell is sufficient to submerge the filter media support structure, but not to significantly enter the filter media zone.

Additionally, the present invention is directed to a method for cleaning a filter media support structure in a filter system having one or more filter cells, the filter media support structure underlying a zone of filter media, wherein the step of controlling the level of solution in the filter cell may comprise measuring a pressure at one or more points in the filter cell, and adjusting the amount or composition of the cleaning liquid being supplied to the filter cell based on at least one pressure measurement. Also, the step of controlling the level of cleaning liquid may comprise monitoring the flow of cleaning liquid into an overflow structure selected from the group consisting of an overflow pipe and an overflow weir.

The present invention is further directed to a method for cleaning a filter media support structure in a filter system having one or more filter cells, the filter media support structure underlying a zone of filter media, further comprising reclaiming the recirculated cleaning liquid during recirculation.

Furthermore, the present invention is directed to a system for cleaning a filter media support structure in a filter system having filter cells, the filter media support structure underlying a zone of filter media, comprising a cleaning liquid supply apparatus for supplying cleaning liquid to the filter cell; a cleaning liquid level control device and an outlet for removing the cleaning liquid from the filter cell. The cleaning liquid supply apparatus supplies cleaning liquid to the filter cell in an amount sufficient to submerge the media support structure, but not to significantly enter the filter media zone.

The present invention is also directed to a system for cleaning a filter media support structure in a filter system having filter cells, the filter media support structure underlying a zone of filter media, further comprising a recirculation apparatus for reintroducing the cleaning liquid into the filter cell.

The present invention is also directed to a system for cleaning a filter media support structure in a filter system having filter cells, the filter media support structure underlying a zone of filter media, wherein the cleaning liquid level control device is configured for controlling the amount of cleaning liquid such that the amount of cleaning liquid in the filter cell is sufficient to submerge the filter media support structure, but not to significantly enter the filter media zone. The cleaning liquid level control device may comprise at least one pressure transmitter located in the filter cell, wherein the pressure transmitter communicates a pressure measurement to the control device, and the control device adjusts the amount or composition of cleaning liquid based at least in part on the pressure measurement communicated to it. The cleaning liquid level control device may also comprise one or more of the group consisting of a level sight tube, an overflow pipe, an overflow weir, a pressure transmitter, a cleaning liquid supply tank, a metering pump and a flow totalizer.

The present invention is also directed to a system for cleaning a filter media support structure in a filter system having filter cells, the filter media support structure underlying a zone of filter media, wherein the cleaning liquid supply apparatus comprises a liquid delivery conduit which extends from a top portion of the filter media zone to a bottom portion of the filter media zone at a point above the media support structure; a pipe grid situated above the media support structure; or a pipe grid situated within an underdrain system. The present invention is also directed to a system, wherein the cleaning liquid supply apparatus is located within a flume chamber or at a point on a pipe connected to a flume chamber selected from the group consisting of an effluent pipe and a backwash pipe.

Lastly, the present invention is also directed to a system for cleaning a filter media support structure in a filter system having filter cells, the filter media support structure underlying a zone of filter media, further comprising a solution agitating apparatus. The solution agitating apparatus may take the form of an air scour supply system.

DESCRIPTION OF THE PREFERRED EMBODIMENTS

In the following Description of the Preferred Embodiments, "filter cell" is a single liquid filter comprising a filter media support structure and a filter media zone.

A "filter system" is a system comprising one or more filter cells.

"Filter media" is a material in a filter cell for removing contaminants from a feed liquid.

"Filter media zone" is the volume of a filter cell, wherein the filter media is positioned.

"Media support structure" is a structure which retains the filter media in the filter cell, including but not limited to one or more of support gravel, a media retainer cap and an underdrain.

The "underdrain" may consist of blocks, plates, perforated pipes, nozzles, slotted plates, folded plates, screens, false bottoms or one of many other well known structures.

"Cleaning liquid" is one or more of an acid, base, chemical, or any other material or substance or combination of materials or substances designed to remove fouling or scaling from a media support structure. The cleaning liquid may or may not be mixed with a conventional backwash liquid, such as water, before introduction to the media support structure. Any mixing of the cleaning liquid with the backwash liquid might take place "in situ" or may take place before the cleaning liquid encounters the media support structure, such as in a pipe, flume or chamber adjacent to and in communication with the media support structure.

"Conduit" is a pipe, a pipe system or other means sufficient to facilitate flow of a fluid, which can be temporary or permanent.

"Flume chamber" is a flume or a chamber in the filter cell wherein feed liquid flows after it passes through an underdrain system and through which backwash liquid is introduced to the underdrain system. This may also be referred to in the art as a gullet or plenum.

Figure 1:
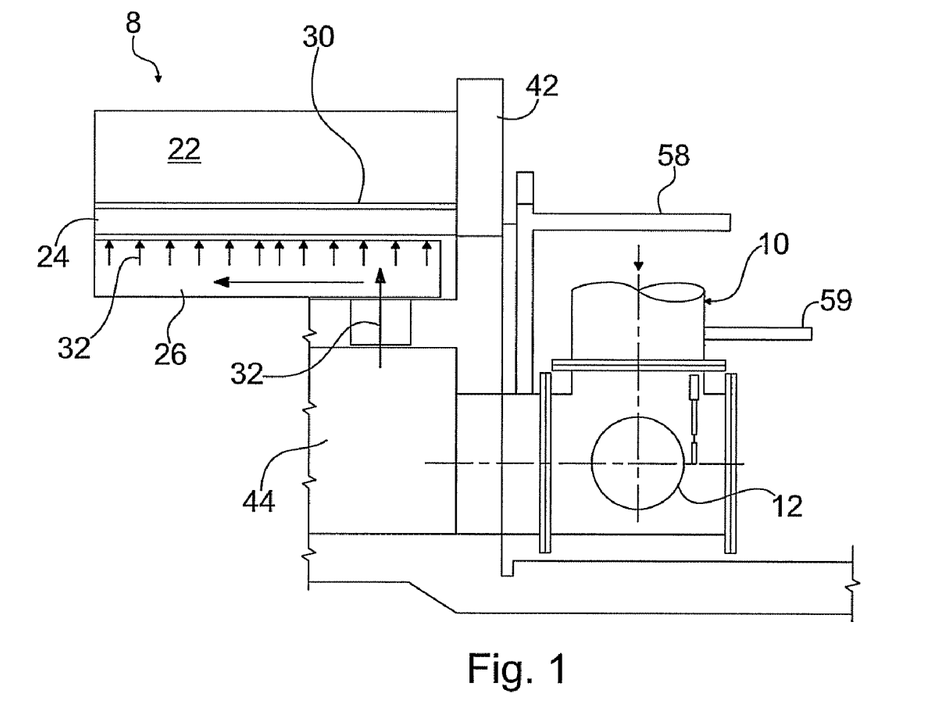
FIG. 1 shows a schematic of a filter cell in a filter system, having a filter media zone supported by a filter media support structure, configured for flow to and from a flume chamber.
Figure 2:
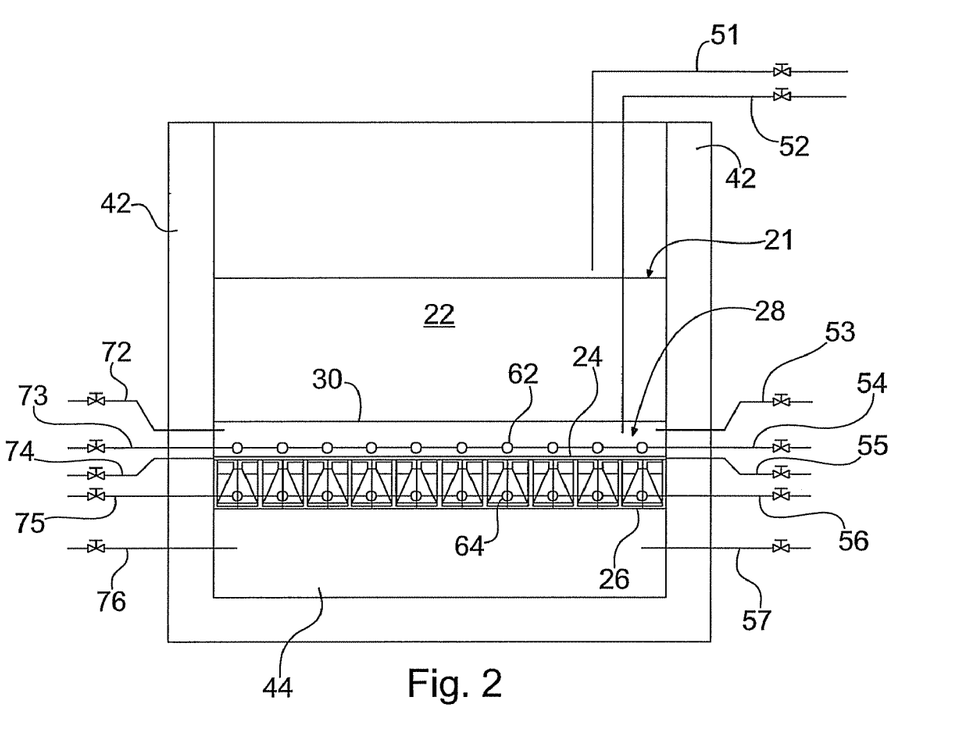
FIG. 2 is a schematic of a filter cell in a filter system, showing possible points of supply and removal of cleaning liquid.

As shown in FIG. 1, a filter cell 8 in a gravity or pressure filter system comprises a filter media support structure 24 which includes an underdrain system 26, and filter media zone 22 housed within filter cell walls 42. Filter cell 8 also comprises a flume 44, a backwash feed pipe 10, an influent pipe (not shown) and effluent pipe 12. In normal operation, a feed liquid flows into filter cell 8 via an influent pipe. The feed liquid passes through filter media zone 22 and filter media support structure 24 to underdrain system 26. The feed liquid then passes from underdrain system 26 into flume chamber 44 and to further processing through an effluent pipe.

Flume chamber 44, as shown in FIGS. 1-6, is oriented underneath underdrain system 26. However, flume chamber 44 may be located beneath, to the side or in any other orientation adjacent underdrain system 26 to facilitate flow of feed liquid for further processing.

Filter media zone 22 is generally comprised of a granular material. Typical materials used as filter media include granular activated carbon, anthracite and high density filtration sand. Additionally, biologically active filter media zones are commonly utilized comprising desirable biologic constituents which remove contaminants from the feed liquid. Because filter media zone 22 is generally a granular material, filter media support structure 24 is required to prevent passing of the granular material into underdrain system 26 with the feed liquid. Filter media support structure 24 is either comprised of gravel or is gravel-less. It retains filter media zone 22, while allowing free flow of the feed liquid. Filter media support structure 24 preferably comprises material with slots, perforations, apertures, or other geometrically-shaped openings; plastic or other material chemically held or sintered together; or other material manufactured to preclude the passage of filter media to the underdrain or collection area.

As shown in FIGS. 1-6, filter media support structure 24 sits atop underdrain system 26. Media support structure 24 may either be separate from or an integral component of underdrain system 26.

Contaminant particles are removed from the feed liquid as it passes through filter media zone 22. After time, filter media zone 22 will require maintenance to remove contaminant particle build-up in filter media zone 22. This maintenance is accomplished by backwashing the filter cell 8. Backwashing comprises draining the feed liquid completely from filter cell 8, closing influent pipe and effluent pipe 12 valves, and flowing a backwash liquid from backwash feed pipe 10 through filter cell 8. The backwash liquid flows from backwash feed pipe 10 into flume 44. The backwash liquid flows into underdrain system 26, through media retainer 24 and filter media zone 22, thereby removing any contaminant particles embedded in filter media zone 22, as indicated by flow arrows 32 in FIG. 1. Optionally, the backwash liquid is agitated. This may be accomplished with air scour, as represented by air scour system 94 in FIG. 5.

In addition to requiring cleaning of filter media zone 22, filter cells, such as filter cell 8, requires periodic cleaning of media support structure 24. After time, the pores of media support structure 24 can become clogged by fouling material. Fouling material usually consists of biological matter or is the result of chemical or mineral scaling. This can cause an increase in pressure drop across media retainer 24. If the pressure drop exceeds a design pressure drop, the entire filter cell 8 may fail. Common cleaning methods require draining filter cell 8 of all feed liquid and completely submerging all components of filter cell 8 in a cleaning solution or complete removal of filter media zone 22, thereby exposing filter media support structure 24 for cleaning. The disadvantages of these methods, discussed above, are overcome by the present invention.

A method for cleaning filter media support structure 24 according to the present invention comprises the steps of draining the feed liquid from filter cell 8, but leaving at least a substantial portion of filter media zone 22 intact in filter cell 8; supplying a cleaning liquid to filter cell 8 in an amount sufficient to submerge filter media support structure 24, but not to significantly enter filter media zone 22 and removing the cleaning liquid from filter cell 8.

The feed liquid will normally be drained through effluent pipe 12 for continued processing; however, other means, such as draining to waste, are also contemplated by the invention. The filter media zone 22 is left undisturbed and remains in filter cell 8 during the entire cleaning operation according to the preferred embodiment of the invention.

The step of supplying a cleaning liquid to filter cell 8 contemplates that a number of various agents or solutions are sufficient for cleaning media support structure 24. Suitable cleaning agents include proprietary cleaning chemicals, biocides, sterilizing solutions, liquid maintenance agents, liquids augmented with enzymes, beneficial bacteria or organisms, ozonated solutions, solutions treated with ultraviolet radiation and other combinations or variations thereof. Preferably, oxidizing chemicals are primarily used to remove biological fouling, and acids are primarily used to remove mineral scaling. One method according to the present invention, especially in systems with biological or organic fouling, comprises supplying sodium hydrochloride and sodium hydroxide, either in tandem or in series, to filter cell 8, wherein the sodium hydrochloride kills any organisms embedded in filter media support structure 24 and the sodium hydroxide digests any organic remnants. Other suitable chemicals include various acids, bases, chlorine and sodium hydroxide. The present invention also contemplates any other chemical or liquid suitable for removing fouling material from media support structure 24.

The step of supplying a cleaning liquid to filter cell 8 requires that the cleaning liquid submerge media support structure 24, while not significantly entering filter media zone 22. As shown in FIGS. 1-6, the amount of cleaning liquid according to the present invention is represented by cleaning liquid level 30 at a height sufficient to submerge media support structure 24, but not significantly encroach upon filter media zone 22. The present invention contemplates that the height at which cleaning liquid level 30 will significantly enter filter media zone 22 will vary widely, depending on the overall height of filter media zone 22. As such, an optimum cleaning liquid level 30 for operation will also vary widely, but it is preferably within a range of about 3-12 inches above media support structure 24.

Supplying the cleaning liquid in an amount sufficient to submerge media support structure 24, while not significantly entering filter media zone 22 may be accomplished in any number of ways. A cleaning liquid supply system may comprise a cleaning liquid supply tank, multiple tanks, pipe systems, or any other apparatus or method capable of supplying cleaning liquid to filter cell 8 in an amount sufficient to submerge media support structure 24, while not significantly entering filter media zone 22.

One embodiment of the present invention supplies cleaning liquid through liquid delivery conduit 52, as shown in FIGS. 2-6. Delivery conduit 52 extends from a top portion 23 of filter media zone 22 to a bottom portion 28 of filter media zone 22 directly above media support structure 24, thereby supplying cleaning liquid to the filter cell. Another embodiment supplies cleaning liquid through delivery conduit 51 to top portion 23 of filter media zone 22. In this embodiment, the cleaning liquid is supplied directly onto filter media zone 22 over a very small area in comparison to the overall surface area of top portion 23 of filter media zone 22, thereby not significantly entering filter media zone 22. The cleaning liquid percolates through filter media zone 22 supplying the solution to filter cell 8 until cleaning liquid level 30 is at a height sufficient to submerge filter media support structure 24, but not to significantly enter filter media zone 22.

Figure 3:
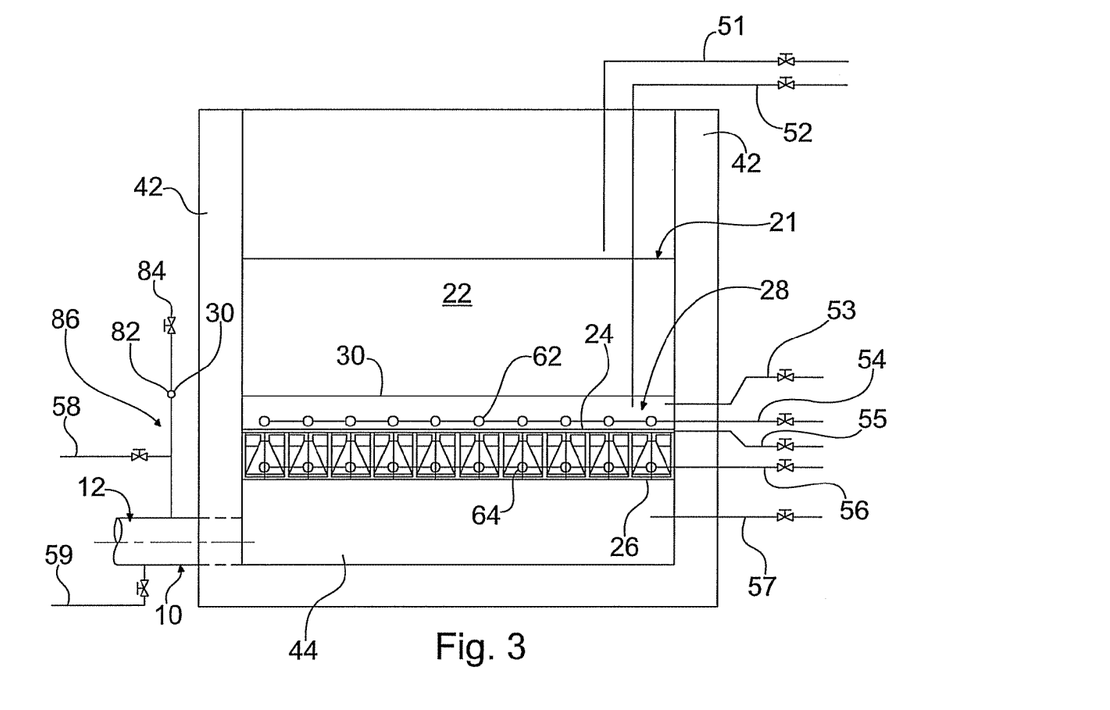
FIG. 3 is a schematic of a filter cell in a filter system, showing an embodiment of the invention with a method and device for monitoring or controlling a cleaning liquid level.

In yet another embodiment, the cleaning liquid may be introduced through effluent pipe 12 or backwash pipe 10 by delivery conduits 58 and 59, as shown in FIG. 1 and FIG. 3. Delivery conduits 58 and 59 are connected to effluent pipe 12 or backwash pipe 10, respectively, thereby delivering cleaning liquid through backwash pipe 10 or effluent pipe 12, into flume chamber 44, through underdrain system 26 and media support structure 24 to cleaning liquid level 30, as indicated by flow arrows 32 in FIG. 1. The cleaning liquid may or may not be mixed with backwash water upon or after entering filter cell 8.

The cleaning liquid may also be supplied at various points above and below media support structure 24. Two such points are represented by delivery conduits 53, above media support structure 24, and 55, directly below media support structure 24. The cleaning liquid may also be introduced simultaneously at a number of points above of media support structure 24 or within underdrain system 26, as represented by pipe grids 62 and 64, shown in FIGS. 2-6. Pipe grid 62 is located at a point above media support structure 24, and pipe grid 64 is located within underdrain system 26. Delivery conduits 54 and 56 deliver cleaning liquid to pipe grids 62 and 64, respectively, thereby supplying cleaning liquid at numerous points across a surface of media support structure 24 or within underdrain 26.

Additionally, the cleaning liquid may be supplied to filter cell 8 by supplying a backwash liquid to filter cell 8, such as fresh water, and mixing the backwash liquid with the water while in filter cell 8. This embodiment may require agitating the backwash liquid and water mixture, for example by air scour system 94, in order to form a uniform cleaning liquid. This may be accomplished by supplying backwash water via backwash pipe 10 to filter cell 8 and injecting the backwash water with the cleaning liquid via delivery conduit 59, as shown in FIG. 1 and FIG. 3. The cleaning liquid will mix with backwash water, producing a cleaning solution, which flows into flume chamber 44 through underdrain system 26 and media support structure 24 to a solution level 30, as indicated by flow arrows 32 in FIG. 1. Lastly, the cleaning liquid 30 may be introduced to filter cell 8 at one or more points located in flume chamber 44, as represented by delivery conduit 57 in FIGS. 2-6. The present invention contemplates, however, that any means for supplying cleaning liquid to filter cell 8 which submerges media support structure 24, but does not significantly expose filter media zone 22 to the cleaning liquid may be used.

The method according to the present invention may also comprise the step of soaking media support structure 24 in cleaning liquid for a period of time sufficient to remove the fouling material from media support structure 24. Preferably, the media support structure 24 may be soaked in cleaning liquid for 1-8 hours. Optionally, the cleaning liquid in filter cell 8 may be agitated, for example, with air scour introduced to filter cell 8 via air scour system 94.

Like the supply of cleaning liquid, removal of cleaning liquid from filter cell 8 may be accomplished by any number of means. The liquid may be removed at points directly below or directly above media support structure 24, as represented by removal conduits 74 and 72, respectively. Removal conduits may be configured as an integral part of pipe grids 62 and 64, as shown by removal conduits 73 and 75. The cleaning liquid may be removed from filter cell 8 at a point located in flume chamber 44, as shown by removal conduit 76. Lastly, the cleaning liquid may be removed via effluent pipe 12 or backwash pipe 10.

Upon removal, the cleaning liquid may be drained to waste, recycled, recirculated to filter cell 8, or circulated to adjacent filter cells in the filter system. If the cleaning liquid is recycled, recirculated or circulated to adjacent filter cells, the cleaning liquid preferably undergoes some manner of reclamation treatment because after use, the strength and reactivity of the cleaning liquid will be significantly diminished. In the case of an acidic solution with a low pH, most of the requisite acid will be consumed during cleaning operation, thereby increasing the pH during cleaning operations. Thus, the cleaning liquid may be treated by decreasing the pH of the cleaning liquid by, for example, adding more acid. In the case of a basic solution with a high pH, most of the requisite base will be consumed during cleaning operation, thereby decreasing the pH during cleaning operations. Thus, the cleaning liquid may be treated by increasing the pH of the cleaning liquid by, for example, adding more base. Solids and other undesirable waste materials may be removed from recycled or recirculated cleaning liquid by allowing the cleaning liquid to settle and separating the undesirable materials from the recycled or recirculated cleaning liquid. Undesirable material may also be removed by decanting the recycled or recirculated cleaning liquid. The present invention also contemplates that reclamation treatment may be accomplished by a filtration process.

In one embodiment of the present invention, the cleaning liquid is continuously removed from and reintroduced into filter cell 8 by means of a recirculation system. The recirculation system may comprise a pump or some other apparatus supplying a motive force, as represented by pump 90 in FIG. 7, capable of removing the cleaning liquid from and reintroducing it into filter cell 8. One means of recirculation comprises introducing the cleaning liquid at one or more points above media support structure 24 and collecting the cleaning liquid at a point in underdrain system 26, as represented by solution removal conduit 75. The cleaning liquid can also be collected at a point in effluent pipe 12 or backwash pipe 10, as represented by removal conduit 77 in FIGS. 4 and 6. Another means of recirculation comprises introducing the cleaning liquid at a point either above or below media support structure 24 and collecting the cleaning liquid at a point opposite the introduction point to provide a cross-flow stream of cleaning liquid across media support structure 24. For example, the cleaning liquid may be introduced via delivery conduit 53 and collected via removal conduit 76, or introduced via delivery conduit 57 and collected via removal conduit 72. The cleaning liquid thereby passes through media support structure 24 creating a cross flow. This cross flow is further illustrated in FIG. 7, wherein the cleaning liquid is supplied to filter cell 8 through delivery conduit 59 and is collected at removal conduit 73. The cleaning liquid is then recirculated to delivery conduit 59 or cleaning liquid supply tank 110 via pump 90. Upon collection at any collection point, the cleaning liquid is recirculated by means of a pump or other apparatus supplying a motive force and is reintroduced to filter cell 8 at its point of introduction. This provides for a continuous flow of cleaning liquid through filter cell 8.

Optionally, the cleaning liquid can undergo reclamation treatment, as described above, during recirculation, after collection from and prior to reintroduction to filter cell 8. This may take the form of measuring a strength, pH or deterioration of the cleaning liquid after removal from filter cell 8 and subjecting the cleaning liquid to reclamation treatment by means of feed-forward or feed-back signals. Also, various methods of measuring an amount of fouling material removal can be employed during recirculation of cleaning liquid. For example, a flow rate of recirculated cleaning liquid through or a headloss or pressure drop across media support structure 24 can be monitored as a measure of cleaning progress, as represented by pressure transmitters 102 in FIG. 7.

Whether employing an embodiment of the present invention directed to a method of cleaning media support structure 24 with or without recirculation, it may be important to monitor cleaning liquid level 30, such that it does not reach a level at which the cleaning liquid significantly enters filter media zone 22. The present invention contemplates that monitoring of liquid level 30 may take any form which is sufficient to prohibit the cleaning liquid from significantly entering filter media zone 22. A level sensor, such as visual sight tube 82, as shown in FIG. 3, may be employed. Visual sight tube 82 is configured such that either cleaning liquid level 30 is at a height equal to a cleaning liquid level visible in visual sight tube 82 or cleaning liquid level 30 in filter cell 8 is visible directly through visual sight tube 82. In one embodiment, this may be accomplished by opening valve 84 on level sensor conduit 86 to the atmosphere. This ensures that the cleaning liquid level in level sensor conduit 86, visible through visual sight tube 82, is equal to cleaning liquid level 30.

Figure 4:
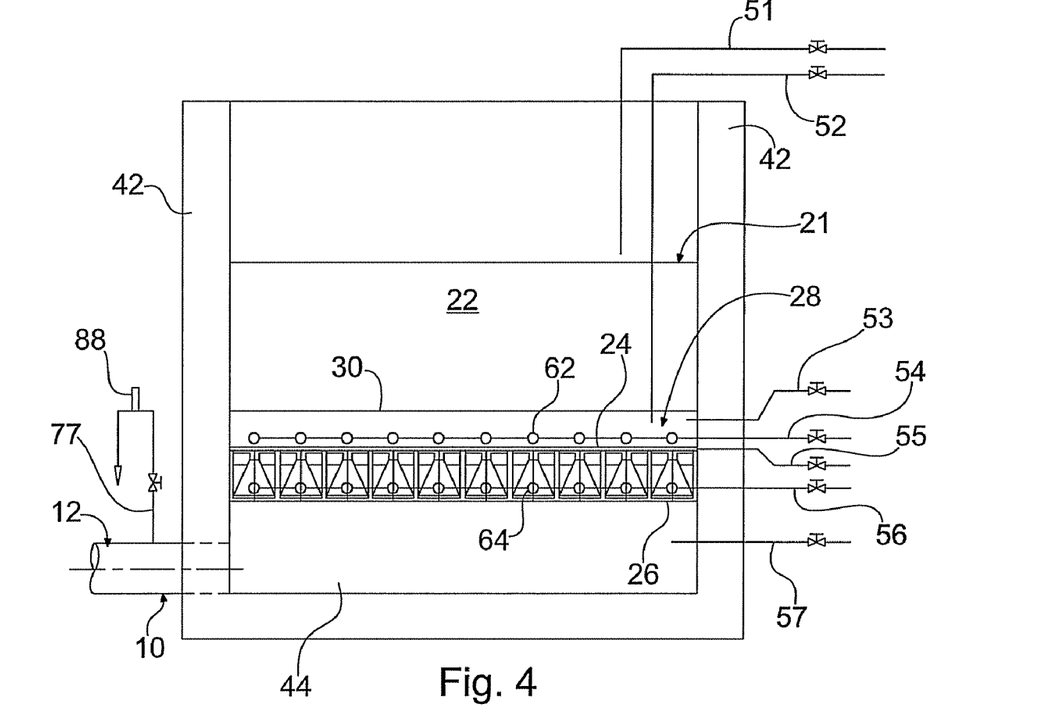
FIG. 4 is a schematic of a filter cell in a filter system, showing an embodiment of the invention with possible points of removal of cleaning liquid and a method of monitoring a cleaning liquid level.
Figure 5:
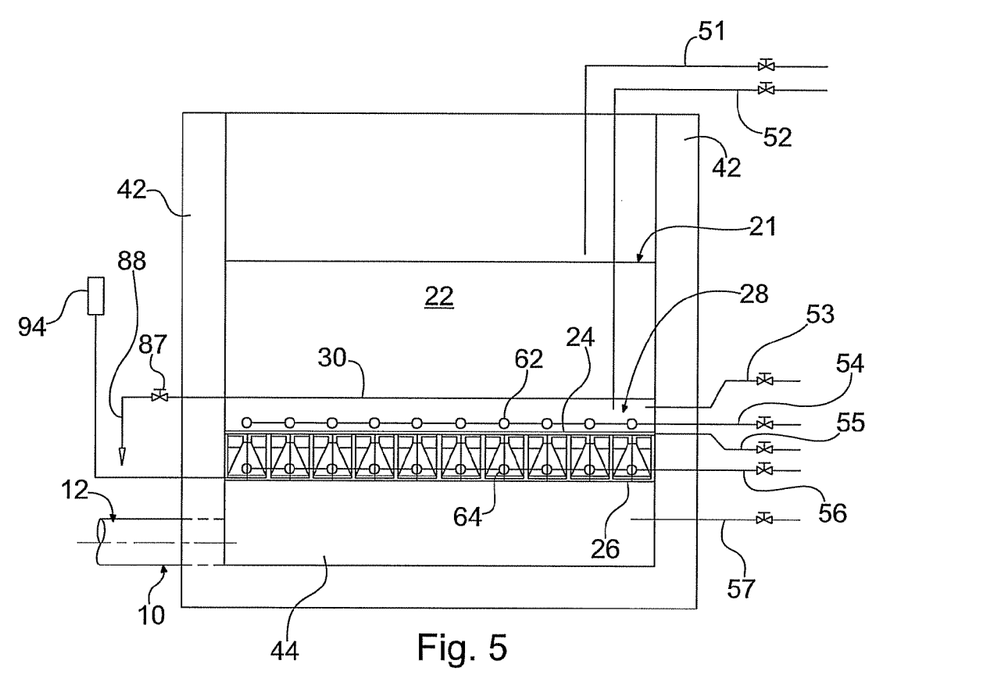
FIG. 5 is a schematic of a filter cell in a filter system, showing another embodiment with a possible point of removal of cleaning liquid and another method of monitoring a cleaning liquid level.
Figure 6:
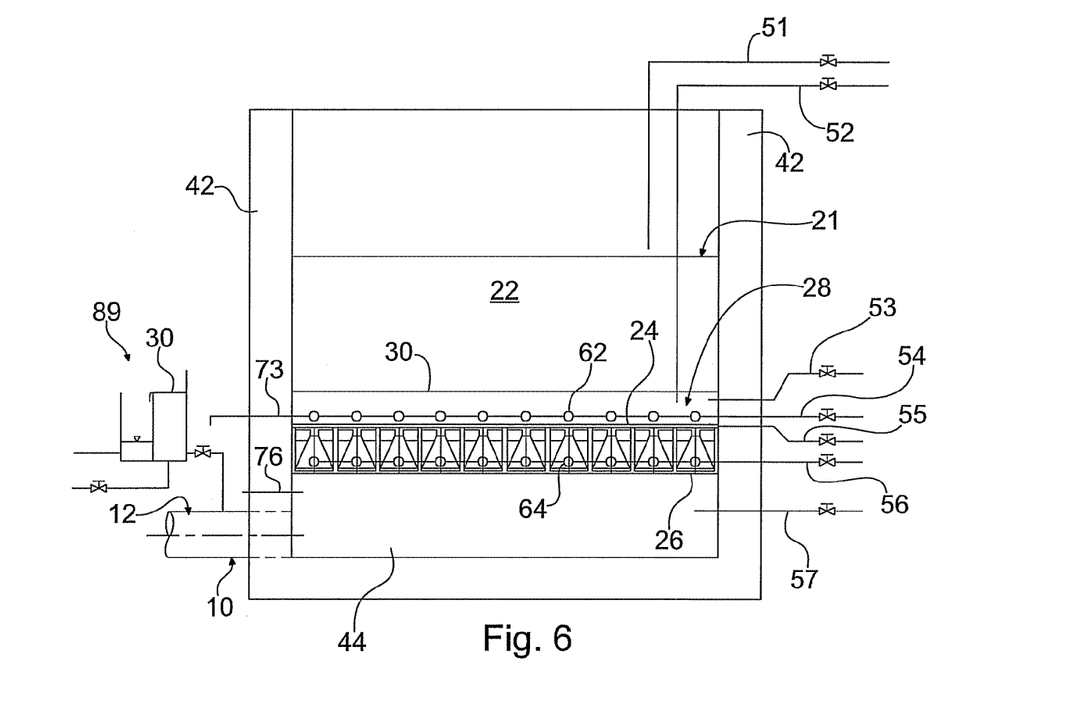
FIG. 6 is a schematic of a filter cell in a filter system, showing yet another embodiment of the invention with another method of monitoring or controlling a cleaning liquid level.

In another embodiment, the monitoring of liquid level 30 may take the form of an overflow structure, such as overflow pipe 88 or overflow weir 89, as shown in FIGS. 4-6. As shown in FIG. 4, overflow pipe 88 is located on a portion of removal conduit 77. Overflow pipe 88 is opened to the atmosphere and removal conduit 77 is configured such that it is capable of receiving a flow rate of cleaning liquid equal to the flow rate at which the cleaning solution is introduced to filter cell 8. In this configuration, in an embodiment of the present invention employing a recirculation system, cleaning liquid level 30 will never reach a height greater than a height of overflow pipe 88. Overflow pipe 88, as shown in FIG. 5, is located a height equal to a desired height of cleaning liquid level 30, wherein the cleaning liquid will not significantly enter filter media zone 22. The operator can visually detect the overflow from pipe 88 or weir 89 and stop the introduction of cleaning liquid to the cell 8, or lower the flow rate.

In another embodiment of the present invention without a recirculation system, as shown in FIG. 5, valve 87 is in an opened position and overflow pipe 88 communicates with cell 8 and is located at a height equal to a desired height of cleaning liquid level 30. When cleaning liquid begins to flow through, into or out of overflow pipe 88, cleaning liquid level 30 will be at a height equal to the height at which the intake of overflow pipe 88 is located. At this point the supply of cleaning liquid should be ceased, ensuring that cleaning liquid level 30 is at height sufficient to submerge media support structure 24, but not to significantly enter filter media zone 22. This may be done manually or automatically, for example by means of a metering pump or flow totalizer configured to shut down the flow of cleaning liquid when a precalculated volume has been introduced to filter cell 8, thereby resulting an optimum cleaning liquid level 30.

In yet another embodiment of the present invention, the monitoring of liquid level 30 may be accomplished via overflow weir 89, as shown in FIG. 6. Because overflow weir 89 is open to the atmosphere and removal conduit 77 is configured such that it is capable of receiving a flow rate of cleaning liquid equal to the flow rate at which the cleaning liquid is introduced to filter cell 8, liquid level 30 should not reach a height higher than a height at which overflow weir 89 is positioned. An embodiment of the present invention without a recirculation system will require shutting off cleaning liquid supply at a point, wherein overflow weir 89 begins to overflow with cleaning liquid. Alternative connection points at which overflow weir 89 may be connected to filter cell 8 are represented by removal conduits 73 and 76, as shown in FIG. 6.

Figure 7:
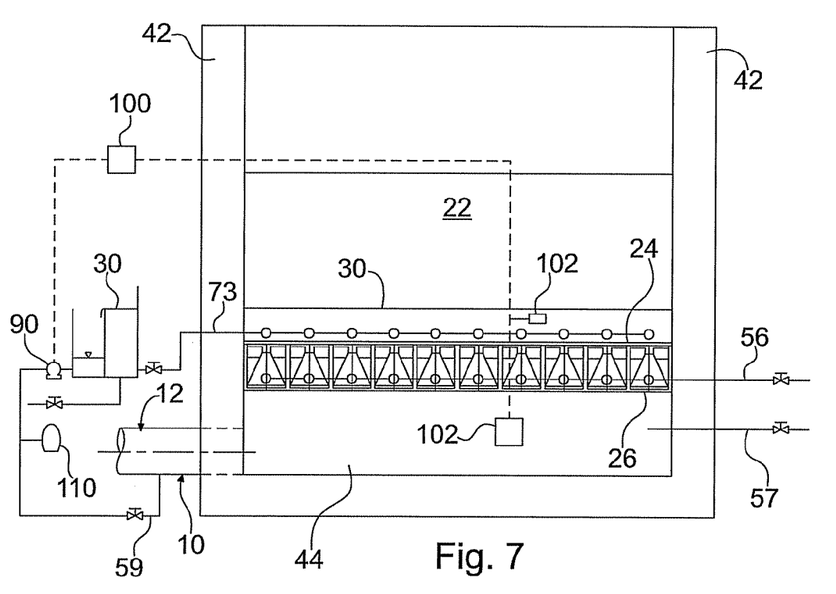
FIG. 7 is a schematic of a filter cell in a filter system, showing another embodiment of the invention further with another method of monitoring or controlling a cleaning liquid level in a recirculation system.

In addition to monitoring the height of cleaning liquid level 30, embodiments of the present invention employing a recirculation system will require some means of controlling cleaning liquid level 30. For example, this may be accomplished by manually altering flow rates or by means of a control system. In one such control system, as shown in FIG. 7, at least one of pressure transmitters 102 monitors a pressure in filter cell 8, for example, in flume chamber 44, or a pressure drop across media support structure 24. The pressure transmitter 102 then communicates monitored pressure to a control device 100 which, by means of a mathematical algorithm, translates the pressure into a cleaning liquid level. The control device 100, in communication with pump 90, then adjusts the cleaning liquid flow rate to filter cell 8 through delivery conduit 59 in order to maintain an optimum height for cleaning liquid level 30. This arrangement may also be used to adjust the strength, concentration or reactivity of the cleaning liquid, wherein control device 100 adjusts the strength or concentration of the cleaning liquid based at least in part on a pressure communicated to it by at least one of pressure transmitters 102.

Lastly, after the cleaning operations are complete, the entire filter cell 8 may be backwashed in order to rid filter cell 8 of any residual contaminants.

While specific embodiments of the invention have been described, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A method for cleaning fouling or scaling from a filter media support structure in a filter system having at least one filter cell, the filter media support structure underlying a zone of filter media, the method comprising the steps of:
    draining a feed liquid from the filter cell, but leaving at least a substantial portion of the filter media in the filter cell;
    supplying a cleaning liquid to the filter cell in an amount sufficient to submerge the media support structure, but not to significantly enter the filter media zone; and
    removing the cleaning liquid from the filter cell;
    wherein the fouling comprises a biological fouling and further wherein the filter media support structure underlies a zone of filter media having desirable biologic constituents; still further wherein the step of removing the cleaning liquid from the filter cell comprises removing the cleaning liquid without substantially reducing the amount of desirable biologic constituents in said filter media zone.

2. The method of claim 1, further comprising the step of soaking the filter the media support structure in the cleaning liquid.

3. The method of claim 1, wherein the step of supplying a cleaning liquid to the filter system in an amount sufficient to submerge the media support structure, but not to significantly enter the filter media zone comprises mixing backwash water with a cleaning agent to produce the cleaning liquid.

4. The method of claim 1, wherein the step of supplying a cleaning liquid to the filter system in an amount sufficient to submerge the media support structure, but not to significantly enter the filter media zone comprises supplying the liquid from above the filter media zone.

5. The method of claim 1, wherein the step of supplying a cleaning liquid to the filter system in an amount sufficient to submerge the media support structure, but not to significantly enter the filter media zone comprises supplying the cleaning liquid via a liquid delivery conduit which extends from a top portion of the filter media zone to a bottom portion of the filter media zone at a point above the media support structure.

6. The method of claim 1, wherein the step of supplying a cleaning liquid to the filter system in an amount sufficient to submerge the media support structure, but not to significantly enter the filter media zone comprises supplying the cleaning liquid via a pipe grid.

7. The method of claim 1, wherein the step of supplying a cleaning liquid to the filter system in an amount sufficient to submerge the media support structure, but not to significantly enter the filter media zone comprises supplying the cleaning liquid to one or more points located in an underdrain system.

8. The method of claim 1, wherein the step of supplying a cleaning liquid to the filter system in an amount sufficient to submerge the media support structure, but not to significantly enter the filter media zone comprises supplying the cleaning liquid to one or more points located in a flume chamber.

9. The method of claim 1, wherein the step of supplying a cleaning liquid to a filter system in an amount sufficient to submerge the media support structure, but not to significantly enter the filter media zone comprises supplying the cleaning liquid through a pipe connected to a flume chamber selected from the group consisting of a backwash pipe and an effluent pipe.

10. The method of claim 1, further comprising the step of, prior to draining, monitoring an amount of fouling in the media support structure.

11. The method of claim 10, wherein the step of monitoring the amount of fouling comprises measuring a pressure drop across the media support structure.

12. The method of claim 1, further comprising the step of monitoring the level of cleaning liquid in the filter cell.

13. The method of claim 12, wherein the step of monitoring the level of cleaning liquid in the filter cell comprises monitoring the level of liquid by means of a level sight tube.

14. The method of claim 12, wherein the step of monitoring the level of cleaning liquid in the filter cell comprises monitoring the flow of cleaning liquid into an overflow structure selected from the group consisting of an overflow pipe and an overflow weir.

15. The method of claim 1, further comprising the step of, after removing the solution, reclaiming the cleaning liquid.

16. The method of claim 15, wherein the step of reclaiming comprises one or more of the following: removing solid fouling material from the cleaning liquid; filtering the cleaning liquid; decanting the cleaning liquid; increasing a pH of the cleaning liquid; and decreasing a pH of the cleaning liquid.

17. The method of claim 1, wherein the cleaning liquid comprises one or more of the group consisting of chlorine, hydrochloric acid, sodium hydroxide and combinations thereof.

18. The method of claim 1, after supplying the cleaning liquid to the filter system, further comprising the step of agitating the cleaning liquid.

19. The method of claim 18, wherein the step of agitating the liquid comprises agitating by air scour.

20. The method of claim 1, after removing the solution, further comprising the step of backwashing the filter cell.

21. A method for cleaning a filter media support structure in a filter system having one or more filter cells, the filter media support structure underlying a zone of filter media, the method comprising the steps of:
   draining a feed liquid from a filter cell, but leaving at least a substantial portion of the filter media in the filter cell;
   supplying a cleaning liquid to the filter cell via a cleaning liquid supply system;
   recirculating the cleaning liquid to the cleaning liquid supply system for reintroduction to the filter cell;
   monitoring a level of the cleaning liquid in the filter cell; and
   controlling, while recirculating the cleaning liquid, the level of cleaning liquid in the filter cell such that the amount of cleaning liquid in the filter cell is sufficient to submerge the filter media support structure, but not to significantly enter the filter media zone.

22. The method of claim 21, wherein the step of controlling the level of solution in the filter cell comprises measuring a pressure at one or more points in the filter cell, and adjusting the amount or composition of the cleaning liquid being supplied to the filter cell based on the at least one pressure measurement.

23. The method of claim 21, wherein the step of controlling the level of cleaning liquid in the filter cell comprises monitoring the flow of cleaning liquid into an overflow structure selected from the group consisting of an overflow pipe and an overflow weir.

24. The method of claim 21, further comprising the step of, during recirculation, reclaiming the recirculated cleaning liquid.

* * * * *

UNITED STATES PATENT AND TRADEMARK OFFICE
CERTIFICATE OF CORRECTION

| | |
|---|---|
| PATENT NO. | : 8,323,514 B2 |
| APPLICATION NO. | : 12/406694 |
| DATED | : December 4, 2012 |
| INVENTOR(S) | : John L. Geibel et al. |

It is certified that error appears in the above-identified patent and that said Letters Patent is hereby corrected as shown below:

Column 12, Line 5, Claim 2, delete "filter the media" and insert -- filter media --

Signed and Sealed this
Twelfth Day of February, 2013

Teresa Stanek Rea
*Acting Director of the United States Patent and Trademark Office*